(12) United States Patent
Tan et al.

(10) Patent No.: US 8,164,930 B2
(45) Date of Patent: Apr. 24, 2012

(54) POWER FACTOR CORRECTION CIRCUIT

(75) Inventors: Yee Chyan Tan, Kuala Lumpur (MY); Yit Koon Lim, Kuala Lumpur (MY)

(73) Assignee: OYL Research and Development Centre Sdn. Bhd., Sg. Buloh, Selangor (MY)

( * ) Notice: Subject to any disclaimer, the term of this patent is extended or adjusted under 35 U.S.C. 154(b) by 467 days.

(21) Appl. No.: 12/014,219

(22) Filed: Jan. 15, 2008
(Under 37 CFR 1.47)

(65) Prior Publication Data
US 2008/0285318 A1 Nov. 20, 2008

(30) Foreign Application Priority Data

Jan. 15, 2007 (MY) .............................. PI 20070060

(51) Int. Cl.
*H02M 1/12* (2006.01)
*G05F 1/40* (2006.01)
(52) U.S. Cl. ............... 363/44; 363/82; 363/89; 323/285
(58) Field of Classification Search .................. 323/222, 323/235, 282, 284, 285, 351; 363/44–48, 363/81, 82, 89, 125, 126
See application file for complete search history.

(56) References Cited

U.S. PATENT DOCUMENTS

| | | | |
|---|---|---|---|
| 4,831,508 A | 5/1989 | Hunter | |
| 5,047,912 A | 9/1991 | Pelly | |
| 5,912,549 A * | 6/1999 | Farrington et al. | 323/207 |
| 6,191,565 B1 * | 2/2001 | Lee et al. | 323/222 |
| 6,756,771 B1 * | 6/2004 | Ball et al. | 323/222 |
| 2005/0253565 A1 | 11/2005 | Cohen | |
| 2010/0118576 A1 | 5/2010 | Osaka | |

FOREIGN PATENT DOCUMENTS

| | | |
|---|---|---|
| EP | 0697569 | 2/1996 |
| JP | 2675509 | 11/1997 |
| JP | 3535902 | 6/2004 |

* cited by examiner

*Primary Examiner* — Jessica Han
(74) *Attorney, Agent, or Firm* — Fish & Richardson P.C.

(57) ABSTRACT

A power factor correction circuit having an input current for reducing the distortion and harmonics generated in a power line feeding power supply. The power factor correction circuit includes a control switch (such as an IGBT) for producing a control switch current and virtual short circuit; a load for acting as power demand from a load and producing a load current; and one or more of resistors for measuring current within said circuit.

9 Claims, 2 Drawing Sheets

POWER FACTOR CORRECTION CIRCUIT

FIELD OF THE INVENTION

The present invention relates to power factor correction circuit for reducing the distortion and harmonics generated in a power line feeding power supply.

BACKGROUND OF THE INVENTION

Power factor correction (PFC) circuits are utilised to reduce harmonics on power lines and in particular, make the circuit, including the attached load, appear to be substantially purely resistive load. The aim of power factor correction circuits is to ensure that the AC voltage and current are substantially in phase. This improves efficiency and at the same time eliminates the generation of harmful harmonics. For example, IEC 61000-3-2 Class A applies to input current up to 16 A per phase. Power factor correction with input current between 10 A to 16 A is expensive to implement. Prior art in Japanese patent no. 3535902 compares output voltage and current of control switch, which requires multiplier in the control circuit to generate switching signals. Circuit with multiplier is more complicated and more sensitive to noise.

Another prior art Japanese patent no. 2675509 implements the current sensor using current transformer to detect current discharged from inductor. Current sensing circuit in this prior art is using current transformer, which is more complicated than current detection using current sensing resistor.

It is an object of the present invention to improve the power correction circuit.

SUMMARY OF THE INVENTION

A power factor correction circuit having an input current for reducing the distortion and harmonics generated in a power line feeding power supply. The power factor correction circuit includes a control switch (such as a IGBT) for producing a control switch current and virtual short circuit; a load for acting as power demand from a load and producing a load current; and one or more of resistors for measuring current within said circuit. The power factor correction circuit preferably has an input current from 0 A to 16 A.

BRIEF DESCRIPTION OF THE DRAWINGS

The foregoing summary, as well as the following detailed description of preferred embodiments of the invention, will be better understood when read in conjunction with the appended drawings. For purpose of illustrating the invention, there are shown in the drawings embodiments, which are presently preferred. It should be understood, however, that the invention is not limited to the precise arrangements and instrumentalities shown.

DETAILED DESCRIPTION OF THE PREFERRED EMBODIMENTS OF THE INVENTION

Figure 1:
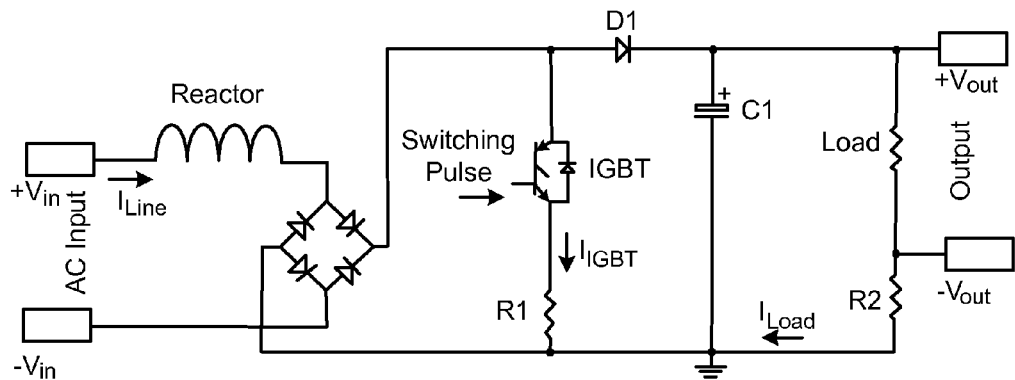
FIG. 1 illustrates a schematic diagram of the power factor correction circuit of one embodiment of the present invention.

FIG. 1 shows a schematic diagram of the power factor correction circuit of one embodiment of the present invention. A power factor correction circuit of the present invention comprising a control switch (IGBT), a load and a plurality of resistors. When, the control switch current (IGBT) is turned on by zero crossing signals. A virtual short-circuits between the positive and negative terminals of the bridge diode (D1) are produced. A reactor is used to prevent the line current from rising too fast so that input current increases gradually with alternative current (AC) input voltage. The control switch current (IGBT) and load current are measured using resistors. Resistor R1 will relate to control switch current (IGBT) to voltage while resistor R2 will relate the load current to voltage.

Figure 2:
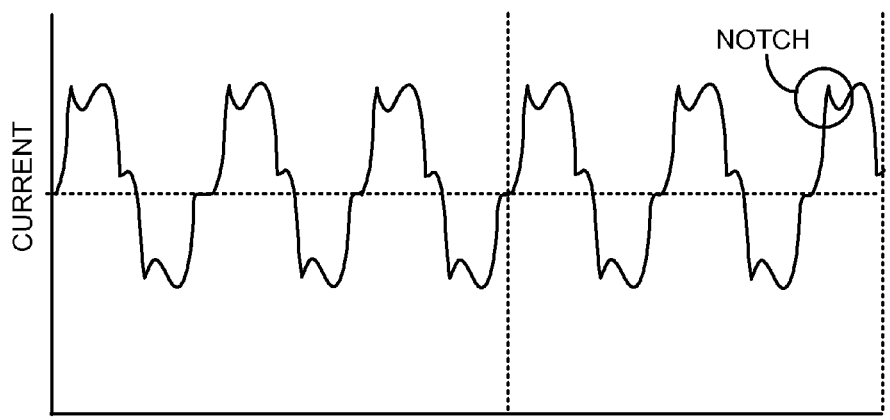
FIG. 2 illustrates a graph input line current harmonic waveform with notch of one embodiment of the present invention.

When the control switch current (IGBT) is between 1.5 to 3 times the value of the load current and corresponding to that voltage across resistor R1 and R2 are equal, the control switch current (IGBT) will turn off. Thus, current flowing though the reactor cannot change immediately. Therefore, the current flowing through the reactor will flow into reservoir capacitor C1 via power diode D1. This action provides a continuous conduction of the input line current, which will improve the power factor and current harmonics to meet the regulation. If the ratio between R2 to R1 is too high, power factor may approach unity but current harmonics may not be able to meet the regulation. A notch may appear in the current waveform as shown in FIG. 2. If the ratio between R2 to R1 is too low, the power factor will be below 90% and current harmonics may not be able to meet the regulation.

Figure 3:
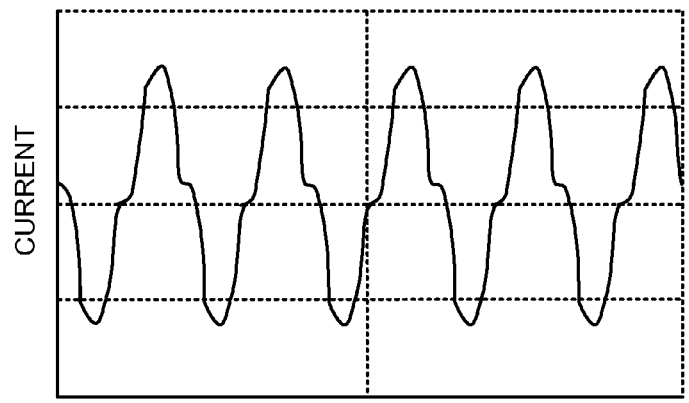
FIG. 3 illustrates a graph input line current harmonic with smoother waveform of one embodiment of the present invention.

Besides improving power factor, the power factor correction circuit of the present invention will improve the current harmonics to meet IEC 61000-3-2 Class A limit or below. When the current rises too fast, a notch may appear in the current waveform as shown in FIG. 2. This notch can cause the current harmonic to get beyond the IEC 61000-3-2 Class A limit. To achieve a smoother current waveform, the rate of the current rising should be lower. One way overcome this problem is to increase the inductance of the reactor. However, this will increase the capacity of the reactor. Another alternative to overcoming this problem is to implement multiple pulse switching. By adjusting the duty cycle of the switching pulse, the rate of the current rising is controllable so that the current waveform is smoother. FIG. 3 shows an example of a smoother current waveform.

The present invention can be applied to air-conditioners. Existing 2 horsepower or 2.5 horsepower (HP) air-conditioner units are using reactor with inductance of 23 mH with rated current at 12 A. Reactor with inductance of 23 mH with rated current at 16 A is too big to fit in 4 HP outdoor air-conditioner unit. The present invention uses a reactor with inductance 18 mH and rated current at 15 A, with 20% reduction of the inductance required.

Further, even though some of the above-mentioned air-conditioner units having power factor correction, which are controlled by microcontroller, the switching method used is a single pulse and the pulse width is determined by look up table. The power factor circuit of the present invention is able to track the load current and determines the switch on time according to the load current. The switching pattern of the present invention is multiple pulses instead of a single pulse as in conventional air-conditioner units.

Figure 4:
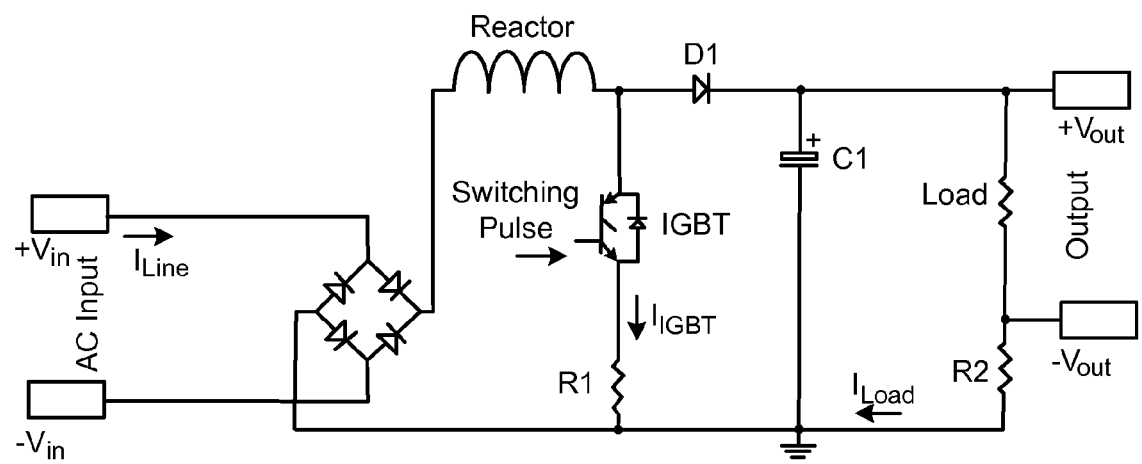
FIG. 4 illustrates a schematic diagram of the power factor correction circuit with a reactor in direct current (DC) line of one embodiment of the present invention.

The power factor correction circuit of the present invention is not limited to be applied to reactor in an alternative current (AC) but also to the reactor in the direct current (DC). FIG. 4 shows a schematic diagram of the power factor correction circuit with a reactor in direct current (DC) line of one embodiment of the present invention. However, placing reactor in DC line can easily saturate the connected reactor as compared to a reactor connected to AC line.

Although the present invention has been described in relation to particular embodiments thereof, many other variations and modifications and other uses will become apparent to those skilled in the art. Therefore, the present invention should be limited not by the specific disclosure herein, but only by the appended claims.

The invention claimed is:

1. A power factor correction circuit for processing an input current to reduce the distortion and harmonics generated in a power supply comprising:
 - a control switch, the control switch producing a control switch current and a virtual short circuit;
 - a first resistor for measuring said control switch current; and
 - a second resistor for measuring an output current, the power factor correction circuit accepting the input current from the power supply and establishing said output current with reduced distortion and harmonics, wherein when a ratio of a current load between the first resistor to the second resistor is between 1.5 and 3, a continuous conduction of the input current and a current harmonic is produced.

2. The power factor correction circuit as claimed in claim 1, wherein said virtual short circuit is between positive and negative terminals of a bridge diode.

3. The power factor correction circuit as claimed in claim 1, wherein said input current is from 0 A to 16 A.

4. The power factor correction circuit as claimed in claim 1, wherein a switching signal is determined between said control switch current and said output current.

5. The power factor correction circuit as claimed in claim 4, wherein said switching signal comprises multiple pulses.

6. The power factor correction circuit as claimed in claim 1, further comprising a reactor, the reactor increasing input voltage gradually.

7. The power factor correction circuit as claimed in claim 1 or 4, wherein said input current is an alternating current and said control switch is turned on when said input alternating voltage is at a zero crossing.

8. The power factor correction circuit as claimed in claim 1, wherein the input current is an alternating current.

9. The power factor correction circuit as claimed in claim 1, wherein the output current is a direct current.

* * * * *